United States Patent [19]

Band et al.

[11] Patent Number: 4,908,950
[45] Date of Patent: Mar. 20, 1990

[54] COORDINATE MEASURING MACHINE

[75] Inventors: Gerhard Band, Oberndorf; Heinz Broghammer, Zimmern; Gunther Ross, Oberndorf, all of Fed. Rep. of Germany

[73] Assignee: Mauser-Werke Oberndorf GmbH, Oberndorf, Fed. Rep. of Germany

[21] Appl. No.: 315,531

[22] Filed: Feb. 24, 1989

[30] Foreign Application Priority Data

Mar. 17, 1988 [DE] Fed. Rep. of Germany ....... 3808871

[51] Int. Cl.⁴ ............................................... G01B 5/00
[52] U.S. Cl. ........................................ 33/503; 33/1 M
[58] Field of Search ................. 33/503, 504, 505, 556, 33/559, 560, 1 M

[56] References Cited

U.S. PATENT DOCUMENTS

| | | | |
|---|---|---|---|
| 3,840,993 | 10/1974 | Shelton | 33/1 M |
| 4,442,607 | 4/1984 | Sakata et al. | 33/503 |
| 4,466,190 | 8/1984 | Ross et al. | 33/503 |
| 4,483,079 | 11/1984 | Band et al. | 33/503 |
| 4,651,426 | 3/1987 | Band et al. | 33/503 |
| 4,651,439 | 3/1987 | Band et al. | |
| 4,680,868 | 7/1987 | Orr et al. | 33/1 M |
| 4,706,372 | 11/1987 | Ferrero et al. | |
| 4,741,112 | 5/1988 | Band et al. | 33/503 |
| 4,763,420 | 8/1988 | McCabe et al. | 33/1 M |

FOREIGN PATENT DOCUMENTS

| | | |
|---|---|---|
| 0255574 | 2/1988 | European Pat. Off. . |
| 3125681 | 1/1983 | Fed. Rep. of Germany . |
| 3517421 | 11/1985 | Fed. Rep. of Germany . |
| 3542766 | 6/1987 | Fed. Rep. of Germany . |
| 3711455 | 1/1988 | Fed. Rep. of Germany . |
| 656222 | 6/1986 | Switzerland . |

OTHER PUBLICATIONS

*Industrie-Anzeiger* No. 104, 1982, pp. 36–38.
Feinwerktechnik & Messtechnik, 89, 1981, pp. 369–374.

*Primary Examiner*—William A. Cuchlinski, Jr.
*Assistant Examiner*—Christopher Fulton
*Attorney, Agent, or Firm*—Scully, Scott, Murphy & Presser

[57] ABSTRACT

A coordinate measuring machine with a base frame which is essentially constructed in the mode of a portal or gantry-type structure which concurrently forms a measuring table, and with a cross-carrier which spans over the measuring table and receives a measuring carriage with a spindle, and which supports itself with one arm on a guideway located in front of the measuring table.

9 Claims, 6 Drawing Sheets

COORDINATE MEASURING MACHINE

BACKGROUND OF THE INVENTION

1. Field of the Invention

The present invention relates to a coordinate measuring machine with a base frame which is essentially constructed in the mode of a portal or gantry-type structure which concurrently forms a measuring table, and with a cross-carrier which spans over the measuring table and receives a measuring carriage with a spindle, and which supports itself with one arm on a guideway located in front of the measuring table

2. Discussion of the Prior Art

A coordinate measuring machine of the type which is under consideration herein is already presently known from the disclosure of German Patent Specification 31 25 681 C2. In this known coordinate measuring machine, the base frame is constituted from at least one molded synthetic resin-concrete component into which the steel guideways are inserted. Thereby, the composition of the synthetic resin-concrete is selected in a manner in the region of the steel guideways, such that the thermal coefficient of expansion thereof generally conforms with that of the steel guideways. Extending from the measuring table, the base frame possesses an axial or longitudinal tie bar which is located high above the measuring table, and into which there is inserted the guideway for the bearing support or pedestal of the cross-carrier. This causes problems to the extent in that already relatively minute deformations, which can be caused by the weight of workpiece which is to be measured on the measuring table, are transmitted through the lengthy level arms of the portal or gantry supports into the guideways, which can lead to swayings of the guideways and, as a consequence, to uncertainties in the accuracy of measurement. In addition thereto, with this type of construction of a coordinate measuring machine constituted from a synthetic resin-concrete, there must be considered that this machine cannot be highly stressed from a thermal standpoint.

As a result thereof, any temperature overloading can lead throughout to deformations of the base frame and the support arms, as well as the carrie.

SUMMARY OF THE INVENTION

In view of the foregoing, commencing from the above-mentioned state-of-the-technology, it is an object of the present invention to provide a coordinate measuring machine of the above-mentioned type, through which there is afforded a high precision in measurement at a maximum speed of displacement or travel, a reliable dependability, a good comfort during operation and servicing thereof, an easy machine assembly and a simplicity in the loading of the measuring table.

The forgoing object is inventively achieved in that the coordinate measuring machine provides for the base frame incorporating a steel-welded construction including a welded-in measuring table top, and with welded-in and hardened or tempered guideways for the movement of the cross-carrier in the Y-direction, which in turn, represents a steel-welded construction with welded-in and hardened guideways for the movement of the measuring carriage in the X-direction, and wherein the rear side of the base frame is formed by a box-shaped support extending in the Y-direction, which protrudes to a limited extent in the Z-direction beyond the measuring table top and possesses a welded-in and hardened guideway on which there travels the rear support arm of the cross-carrier Y-direction, whereas the front support arm of the cross-carrier travels on a guideway which is welded-in and hardened below the plane of the measuring table top.

This inventive coordinate measuring machine affords a series or advantages. Thus, on the basis of the inventive of construction there is obtained a rigid base frame can be positioned on pneumatic spring or shock-ab elements, as a result of which there can be eliminated the heed for any separate machine foundation The entire base frame is constructed in an extremely manner, as a result of which there are avoided to considerable extent any deformations during the depositing of any weight on the measuring table. Because of short lever arms extending from the measuring to the guideways, any eventually encountercd deformations can be readily absorbed without any in the quality of measurement. Through the relative low height of the measuring table and the open to the measuring table from three sides thereof, the is afforded an ideal ability in the loading of the coordinate measuring machine. The same is applicable for the operating and servicing of the measuring machine, inasmuch as in this instance, the operating personnel is provided with an extremely good degree of accessibility to the entire measuring area. The measuring table top is an integrated fixed component in the rigidly connected base frame with its separately assembled guidances. The guideway paths or running surfaces are welded-in and hardened or tempered. The cross-carrier is symmetrically constructed and possesses fixedly integrated steel guideways, as well as support arms, whereby the front support arm is equipped with a slot for elongate probe arms. Inasmuch as the guide rails are no longer screwed on, this coordinate measuring machine alsono lnnger requires any capability for mechanical corrections.

Overall considered, this coordinate measuring machine affords a good surface for the guideways and a uniform running response for the entire machine with a high dynamic of operation and control, as a result of which any vibrations are rapidly suppressed. Of completely special advantage is the low machine weight which is attained through this type of construction, at concurrently a high degree of precision for the system and high dynamic.

BRIEF DESCRIPTION OF THE DRAWINGS

Reference may now be had to the following detailed description of a preferred embodiment of the invention, taken in conjunction with the accompanying drawings; in which.

DETAILED DESCRIPTION

Figure 1:
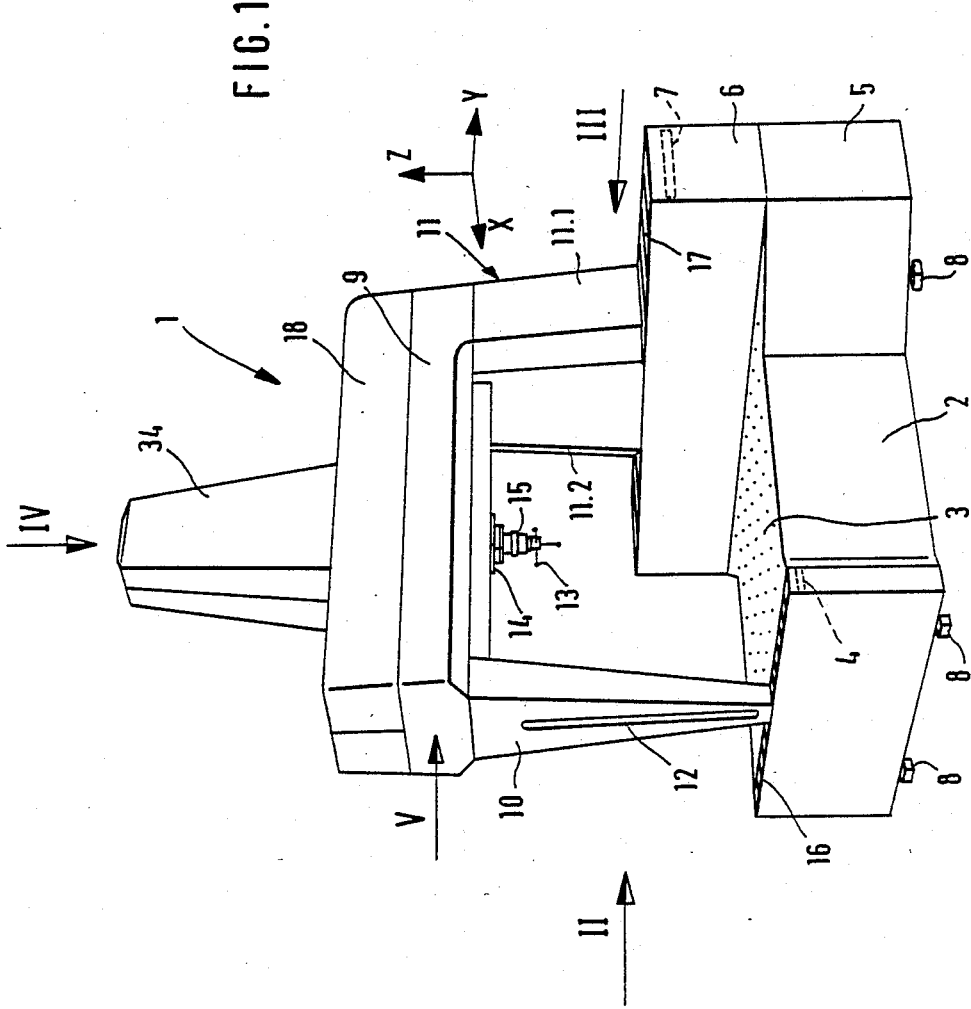
FIG. 1 illustrates a front and side perspective view of the coordinate measuring machine constructed pursuant to the invention.
Figure 2:
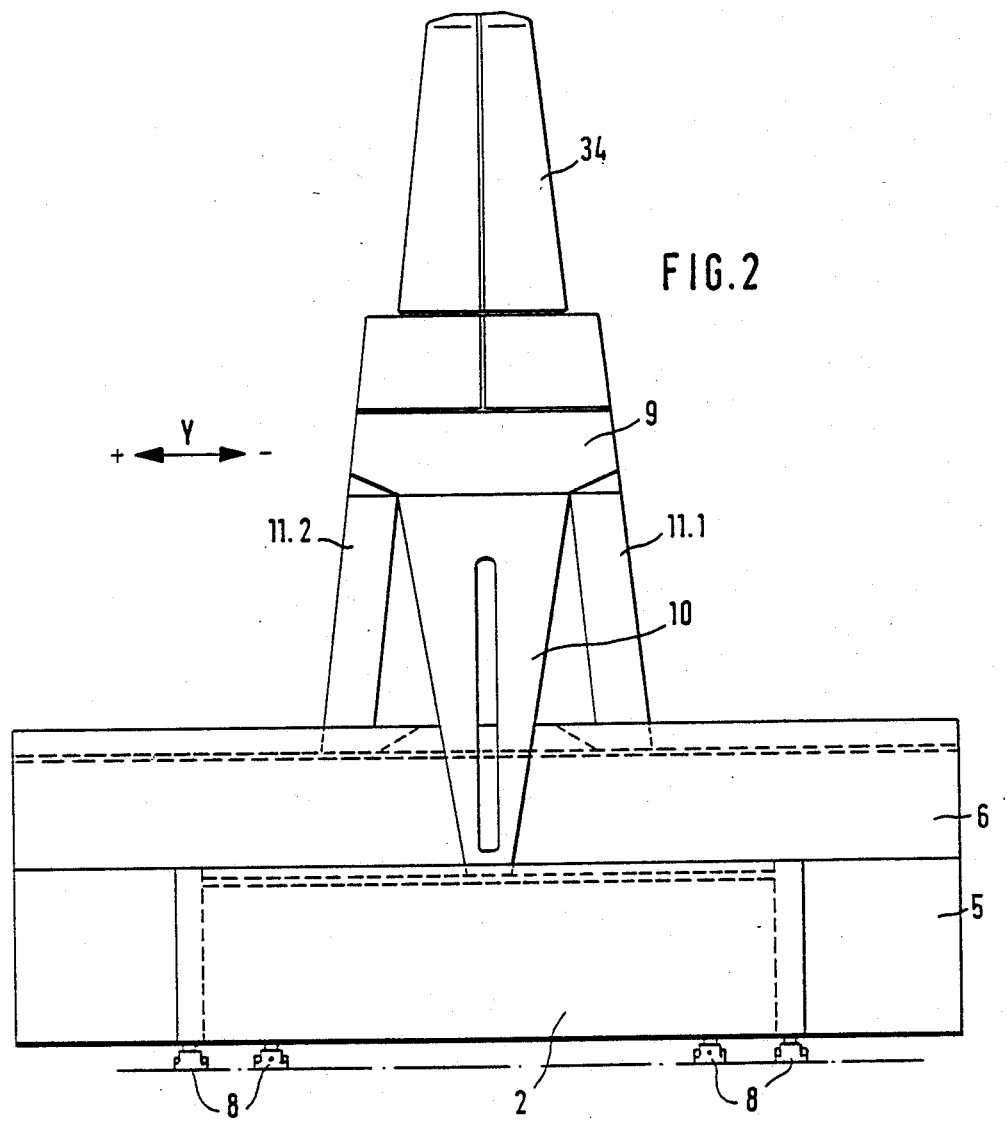
FIG. 2 illustrates a front elevational view of the coordinate measuring machine in the direction of arrow II in FIG. 1.
Figure 3:
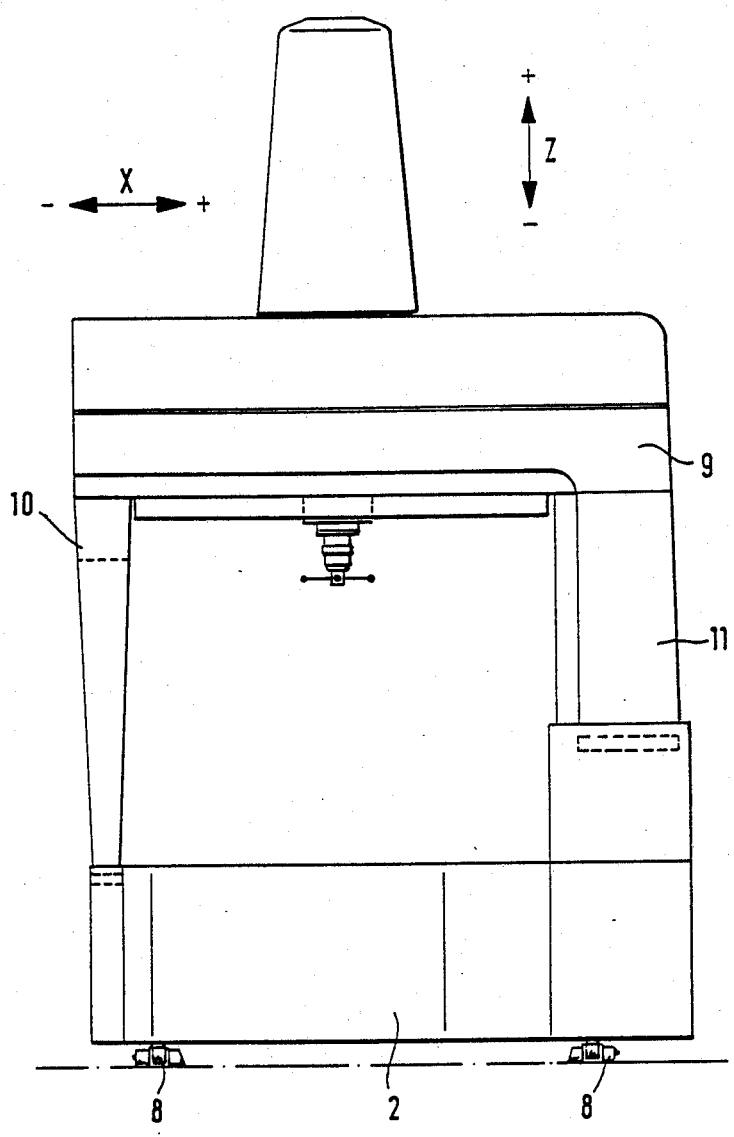
FIG. 3 illustrates a side elevational view of the coordinate measuring machine taken in the direction of arrow III in FIG. 1.
Figure 4:
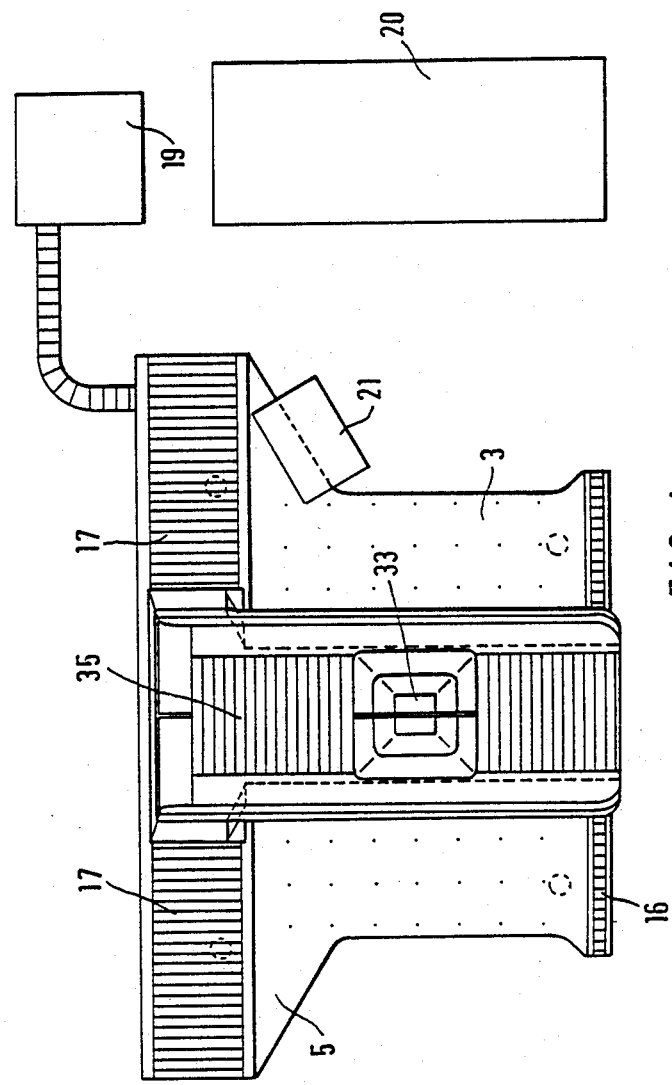
FIG. 4 illustrates a top plan view of the coordinate measuring machine taken in the direction of arrow IV in FIG. 1.
Figure 5:
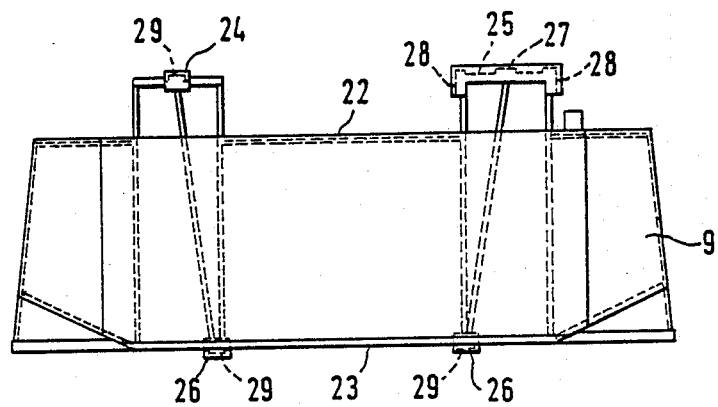
FIG. 5 illustrates a view of the cross-carrier with the guideways taken in the direction of arrow V in FIG. 1.
Figure 6:
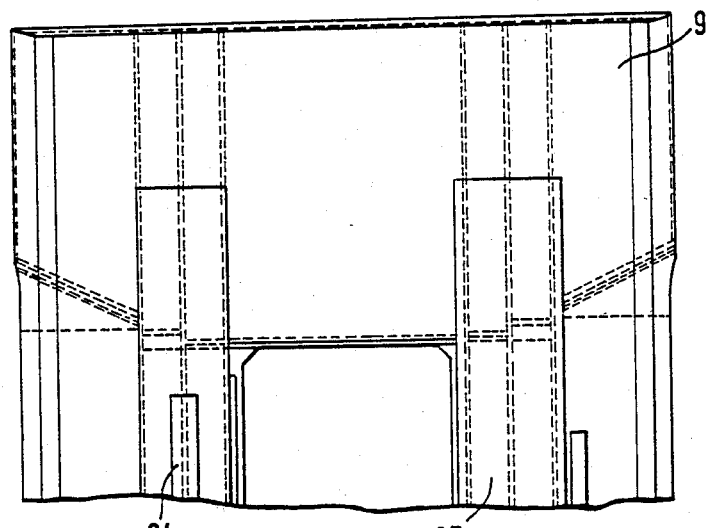
FIG. 6 illustrates a top plan view of the cross-carrier with the guideways taken in the direction of arrow VI in FIG. 5.
Figure 7:
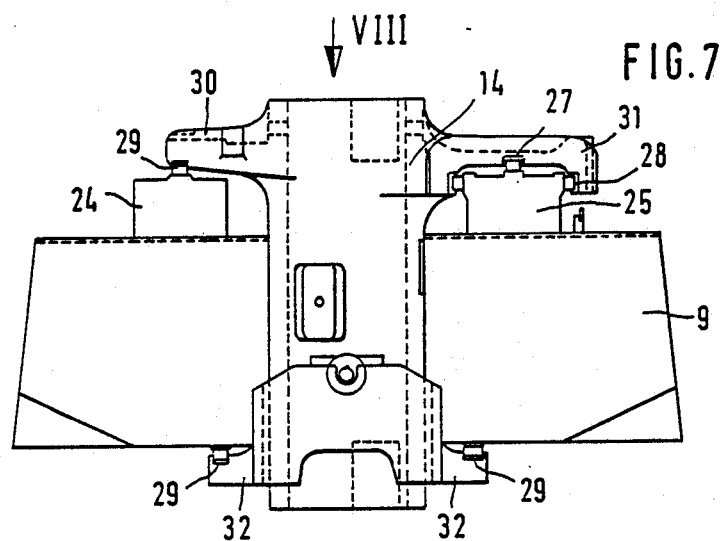
FIG. 7 illustrates an end view of the measuring carriage on the cross-carrier.
Figure 8:
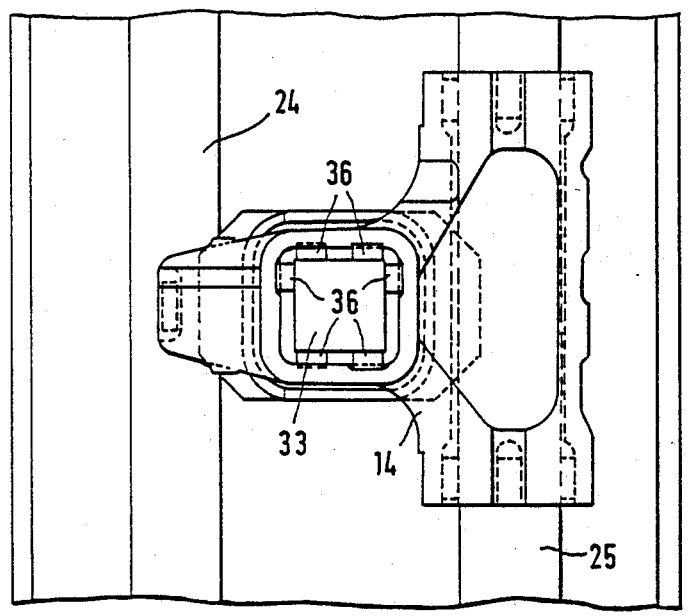
FIG. 8 illustrates top plan view of the measuring carriage taken in the direction of arrow VIII in FIG. 7.

The coordinate measuring machine 1, which is constructed in the manner of a portal or gantry-type structure, essentially consists of a base frame 2 with a welded-in measuring table top 3 and a welded-in and hardened or tempered guideway 4 in the front region.

The rear side of the base frame is formed by a box-shaped support 5, which protrudes with a molded part 6 mounted thereon only a small extent above the measuring table top 3. In this upper molded part 6, there is again provided a welded-in and hardened guideway 7. The entire base frame 2 with the rear wall 5 and 6 is steel-welded construction and is essentially constructed in box-shape. The guideways 4 and 7, as well as the measuring table top 3, are conjointly ground in a single machining operation on a grinding machine. This base frame possesses only a few jointed parts and an overall low weight. The setting up of the base frame is undertaken on pneumatic support elements or shock absorbers 8. A special machine foundation is not necessary in this type of construction for the coordinate measuring machine 1.

The rear support 5 with the molded component 6 mounted thereon extends in the Y-direction and is suitably elongateable in this type of construction. This signifies that this base frame 2 represents a machine concept which is not dependent upon length.

Arranged to extend transversely above the measuring table plate 3 is a cross-carrier or support 9 which is in a box-shaped configuration and in a steel-welded construction, and which is equipped with welded-in and hardened or tempered guideways. The symmetrically constructed cross-carrier 9 rests on a similarly symmetrical front support or arm pedestal 10, as well as on a rear support arm 11, which is constituted of two supports 11.1 and 11.2. In the front arm 10 there is provided a vertically extending elongated slot 12, through which there are insertabl even relatively lengthy probe arms 13 of a probe 15 which is fastened to the measuring carriage 14. The guideways 4 and 7 of the base frame 2 are covered by plastic louvers 16 and 17 and protected against the entry of dust.

Hereby, the plastic louvers 16 and 17 are presently in connection with the support arms 10, 11 of the cross-carrier 9.

The external configuring of the coordinate measuring machine is, in essence, achieved by molded plastic components 18 which are attached from the outside onto the structural elements, which also concurrently represent also a protection for the basic construction and the dries, as well as for the controls of the coordinate measuring machine. The control over the coordinate measuring machine 1 is effectuated from a control unit 19 and a data station 20, as well as from a control panel 21 which is in operative interconnection with the coordinate measuring machine 1.

The box-shaped cross-carrier 9 which is produced in a steel-welded construction is built symmetrically, and possesses two guideways 24, 25 arranged on its upper side and two guideways 26 on its bottom surface 23.

The guideway 24 is hereby constructed narrower in width than the guideway 25 which is arranged in parallel spaced relationship thereto, which possesses an upper running or traveling surface 27 as well as two side running surfaces 28. In contrast therewith, the guideways 24 and 26 always possess only an upper running surface 29. The carriage 14 includes two upper arms 30 and 31 which slide along on the guideways 24 and 25 with corresponding complementary running surfaces. The carriage 14 possesses two further arms 32 which are directed towards the bottom side 23 of the cross-carrier 9 and which, in turn, again lie by means of corresponding complementary running suffaces on the guideway surfaces 29. Due to this construction, the carriage 14 is securely movable both on top and bottom on the cross-carrier 9 along the guideways 24, 25 and 26. In the carriage 1,, centrally intermediate the parallel extending guideways 24 and 25, the spindle 33 is arranged in separate guideways 36 for the mounting of the probe 15. The drive components for the spindle 33 are arranged within the covering hood 34 which is located above the cross-carrier 9. In order to also obtain a corresponding protection against dust for the spindle during its path of travel along the X-direction, the cross-carrier is similarly provided on its upper surface with a plastic jalousie or louver 35, which is in operative connection with the carriage 14.

What is claimed is:

1. A coordinate measuring machine of essentially portal or gantry-type construction; comprising a base frame concurrently forming a measuring table; a cross-carrier extending over said measuring table; a measuring carriage with a spindle on said cross-carrier, an arm of said cross-carrier being supported on a guideway in front of said measuring table, said base frame consisting of a steel-welded construction having a welded-in measuring table top and welded-in and hardened guideways for the movement of the cross-carrier in the Y-direction, said cross-carrier consisting of a steel-welded construction having welded-in and hardened guideways for the movement of the measuring carriage in the X-direction, said base frame having a rear side formed by a box-shaped support extending in the Y-direction, said support slightly protruding in the Z-direction beyond the measuring table, a welded-in and hardened guideway on said support along which there is movable in the Y-direction a rear support arm of the cross-carrier, the front support arm of the cross-carrier being movable along a welded-in and hardened guideway on said base frame below the plane of the measuring table top.

2. A coordinate measuring machine as claimed in claim 1, wherein said base frame inclusive the rear support is supported on at least four pneumatic spring elements.

3. A coordinate measuring machine as claimed in claim 1, wherein the front support arm includes an elongated slot extending in the Z-direction.

4. A coordinate measuring machine as claimed in claim 1, wherein the front support ar in conjunction with said cross-carrier is constructed symmetrically.

5. A coordinate measuring machine as claimed in claim 1, wherein the measuring table top is constructed in said base frame separately from said guideways.

6. A coordinate measuring machine as claimed in claim 1, wherein said cross-carrier includes two guideways arranged in parallel spaced relationship, one said guideway including one upper and two side running tracks, and the other guideway including an upper running track, said measuring carriage including side arms with guideway surfaces which slide on the running tracks of the guideways on the cross-carrier.

7. A coordinate measuring machine as claimed in claim 1, wherein said cross-carrier includes two upper guideways and two further welded-in and hardened guideways in the bottom side thereof, which correspond with complementary running surfaces on the measuring carriage.

8. A coordinate measuring machine as claimed in claim 1, wherein said base frame and said cross-carrier with the support arms and the direction of drive for the Z-axis are externally clad with molded plastic components.

9. A coordinate measuring machine as claimed in claim 1, wherein plastic louvers cover said guideways and are operatively connected with the support arms and the measuring carriage.

* * * * *

UNITED STATES PATENT AND TRADEMARK OFFICE
CERTIFICATE OF CORRECTION

PATENT NO. : 4,908,950

DATED : March 20, 1990

INVENTOR(S) : Gerhard Band, et al.

It is certified that error appears in the above-identified patent and that said Letters Patent is hereby corrected as shown below:

Column 1, line 32: "of workpiece" should read as --of a workpiece--.

Column 1, line 44: "carrie" should read as --carrier--.

Column 2, line 2: "cross-carrier Y-direction" should read as --cross-carrier in the Y-direction--.

Column 2, line 7: "series or" should read as --series of--.

Column 2, lines 7-8: "inventive of construction" should read as --inventive type of construction--.

Column 2, lines 8-9: "frame can" should read as --frame which can--.

Column 2, line 9: "shock-ab" should read as --shock-absorbing--.

Column 2, line 11: "heed" should read as --need--.

Column 2, line 11: "foundation The" should read as --foundation. The--.

Column 2, line 12: "extremely manner," should read as --extremely compact manner--.

Column 2, line 13: "to considerable" should read as --to a considerable--.

UNITED STATES PATENT AND TRADEMARK OFFICE
CERTIFICATE OF CORRECTION

PATENT NO. : 4,908,950

DATED : March 20, 1990

INVENTOR(S) : Gerhard Band, et al.

It is certified that error appears in the above-identified patent and that said Letters Patent is hereby corrected as shown below:

Column 2, line 17: "measuring to" should read as --measuring table to--.

Column 2, line 18: "encountercd deformations" should read as --encountered minor deformations--.

Column 2, line 19: "any in" should read as --any loss in--.

Column 2, line 20: "relative" should read as --relatively--.

Column 2, line 21: "open" should read as --open accessibility--.

Column 2, line 37: "alsono lnnger" should read --also no longer--.

Column 3, line 12: "cssentially" should read as --essentially--.

Column 3, line 22: "in box-shape" should read as --in a box-shape--.

Column 3, line 26: "frame is" should read as --frame 2 is--.

Column 3, line 46: "insertabl" should read as --insertable--.

Column 3, line 59: "dries" should read as --drives--.

UNITED STATES PATENT AND TRADEMARK OFFICE
CERTIFICATE OF CORRECTION

PATENT NO.  :  4,908,950

DATED       :  March 20, 1990

INVENTOR(S) :  Gerhard Band, et al.

It is certified that error appears in the above-identified patent and that said Letters Patent is hereby corrected as shown below:

Column 4, line 13:  "surffaces"  should read as --surfaces--.

Column 4, line 17:  "carriage 1,,"  should read as --carriage 14.--.

Column 4, line 59:  "ar"  should read as --arm--.

Signed and Sealed this

Sixth Day of August, 1991

Attest:

HARRY F. MANBECK, JR.

Attesting Officer

Commissioner of Patents and Trademarks